United States Patent
Huang et al.

(10) Patent No.: US 8,450,017 B2
(45) Date of Patent: May 28, 2013

(54) FUEL-CELL-BASED COGENERATION SYSTEM WITH RADIO FREQUENCY IDENTIFICATION SENSORS

(75) Inventors: To-Wei Huang, Kwei Shan Township, Taoyuan County (TW); Ting-Kuan Li, Kwei Shan Township, Taoyuan County (TW); Zhan-Yi Lin, Kwei Shan Township, Taoyuan County (TW); Yu-Ming Sun, Kwei Shan Township, Taoyuan County (TW); Chi-Bin Wu, Kwei Shan Township, Taoyuan County (TW)

(73) Assignee: Chung-Hsin Electric and Machinery Manufacturing Corp., Jhonghe, Taipei County (TW)

(*) Notice: Subject to any disclaimer, the term of this patent is extended or adjusted under 35 U.S.C. 154(b) by 416 days.

(21) Appl. No.: 12/961,812

(22) Filed: Dec. 7, 2010

(65) Prior Publication Data

US 2012/0105206 A1 May 3, 2012

(30) Foreign Application Priority Data

Nov. 1, 2010 (TW) .................. 99137394 A

(51) Int. Cl.
*C01D 7/00* (2006.01)
*C01G 21/14* (2006.01)
*C01B 31/32* (2006.01)
*H04Q 5/22* (2006.01)
*G05B 11/01* (2006.01)

(52) U.S. Cl.
USPC ........... 429/423; 429/434; 429/435; 429/441; 429/436; 340/10.3; 340/10.31; 340/10.4; 340/12.51

(58) Field of Classification Search
None
See application file for complete search history.

(56) References Cited

U.S. PATENT DOCUMENTS

2004/0233043 A1* 11/2004 Yazawa et al. ............... 340/10.3
2005/0249991 A1* 11/2005 Pastula et al. .................. 429/20
2006/0232437 A1* 10/2006 Gutowski et al. ........ 340/825.69

* cited by examiner

*Primary Examiner* — Jennifer Mehmood
*Assistant Examiner* — Pameshanand Mahase
(74) *Attorney, Agent, or Firm* — Juan Carlos A. Marquez; Stites & Harbison PLLC

(57) ABSTRACT

The present invention discloses a fuel-cell-based cogeneration system with radio frequency identification (RFID) sensors. The fuel-cell-based cogeneration system with RFID sensors includes the fuel-cell-based cogeneration system and an RFID data processing system. The RFID data processing system captures data of the temperature and flow rate from the RFID sensors, while the system data are in turn converted into RFID signals. The RFID data processing system transmits a control signal generated from the RFID signal to control the operation of the fuel-cell-based cogeneration system. Since the RFID transmission technology, the sensor error caused by wires is consequently reduced. Furthermore, overall sensitivity and accuracy of the RFID sensors are increased, which leads to an accompanying increase in the stability of the operating system.

7 Claims, 5 Drawing Sheets

301

| RFID Sensor Address | RFID Sensor Information | RFID Sensor Address | RFID Sensor Information | RFID Sensor Address | RFID Sensor Information |

FIG. 2

FUEL-CELL-BASED COGENERATION SYSTEM WITH RADIO FREQUENCY IDENTIFICATION SENSORS

BACKGROUND OF THE INVENTION

1. Technical Field

The present invention relates to fuel-cell-based cogeneration systems, and more particularly, to a fuel-cell-based cogeneration system with radio frequency identification sensors wherein the RFID technology is applied to the fuel-cell-based cogeneration system.

2. Description of Related Art

With the recent economic development, demand for electricity is increasingly growing, and power shortage happens frequently in peak hours. Although power brownouts have been conducted as an expedient, this approach brings serious inconvenience to the people's livelihood and industries. Other approaches to improving power shortage include building new power plants and enhancing energy efficiency. However, the increasing environmental consciousness and the limited natural resources make building new power plants an unwise choice. Therefore, the most feasible way nowadays to remedy power shortage seems being enhancing energy efficiency.

Fuel-cell-based cogeneration systems have been introduced as a part of green industry. Such a system is composed of a fuel cell and a combined heat and power system, wherein the combined heat and power system retrieves the waste heat generated by the operating fuel cell and stores the same in the form of hot water in an isolating device, so as to provide electricity and hot water simultaneously, thereby reusing and leveraging energy.

However, for operating the fuel cell, it is necessary to introduce water with constant flow rate and constant temperature so as to bring out the waste heat. Thus, the water routes in the system have to be equipped with sensors for flow and temperature, so as to monitor and adjust the system timely, and in turn ensure the stable operation of the overall system.

Conventionally, for fitting the sensors to the configuration and layout of the system, the shielding wires of the sensors are likely to be bent, and this may cause measuring errors of the sensors. Moreover, the impedance of sensors is subject to the lengths of the shielding wires, so the shielding wires may not be trimmed without problem. If one tries to extend the shielding wires with compensating wires, the impedance can consequently become larger and significantly affect the measuring accuracy. Therefore, the length of the shielding wires is not flexible. In addition, the system is to be packaged in a confined housing and this also adds difficulty in wiring.

To sum up, since the accuracy of the sensors highly depends on the numerous sensor wires that cannot be bent, trimmed or extended, in the mass production of a fuel-cell-based cogeneration system, there is no choice but manual wiring. This not only increases labor costs, but also hinders the system from putting into modulization.

SUMMARY OF THE INVENTION

The present invention provides a fuel-cell-based cogeneration system with radio frequency identification sensors, wherein by using the RFID sensors, the sensor error caused by bent, extended or trimmed wires is consequently reduced so that overall sensitivity to temperature and flow of the system can be enhanced, and the stability of the system can be in turn improved.

The present invention provides a fuel-cell-based cogeneration system with radio frequency identification sensors, wherein the RFID sensors help to simplify wiring and lower the costs of manual wiring, so as to allow modular production of the fuel-cell-based cogeneration system.

To achieve the above effects, the present invention provides a fuel-cell-based cogeneration system with radio frequency identification sensors, comprising: the fuel-cell-based cogeneration system that includes a fuel cell having a first output end and a first input end; a first heat exchange pipe communicating the first output end and the first input end, and having a heat-dissipating motor, a first RFID sensor, a second RFID sensor, a first lateral of a heat exchanger and a third RFID sensor connected successively in series along the direction of water flows therein; an isolating device having a chamber, which comprises a second output end, a second input end and at least one opening; and a fourth RFID sensor that is combined with the isolating device for detecting a water temperature in the chamber; and a second heat exchange pipe communicating the second output end and the second input end, and having a heat-storing motor, a fifth RFID sensor and a second lateral of the heat exchanger connected successively in series along the direction of water flows therein; and an RFID data processing system that includes: an RFID reader, when enabled, transmitting a first RFID signal to each said RFID sensor, and receiving a second RFID signal transmitted by each said RFID sensor; and a microprocessor enabling the RFID reader, and generating a control signal according to the second RFID signal for controlling the heat-dissipating motor and the heat-storing motor.

By implementing the present invention, at least the following progressive effects can be achieved:

1. Since the sensor error caused by wires is improved, the overall sensitivity of the fuel-cell-based cogeneration system to temperature and flow can be enhanced, so that the accuracy of the system can be increased and the stability of the system can be in turn ensured.

2. Since the wiring is simplified, the modular production of the fuel-cell-based cogeneration system becomes feasible to ensure the productive efficiency.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein:

FIG. 2 is a schematic drawing of an RFID package according to the embodiment of the present invention;

DETAILED DESCRIPTION OF THE INVENTION

Figure 1:
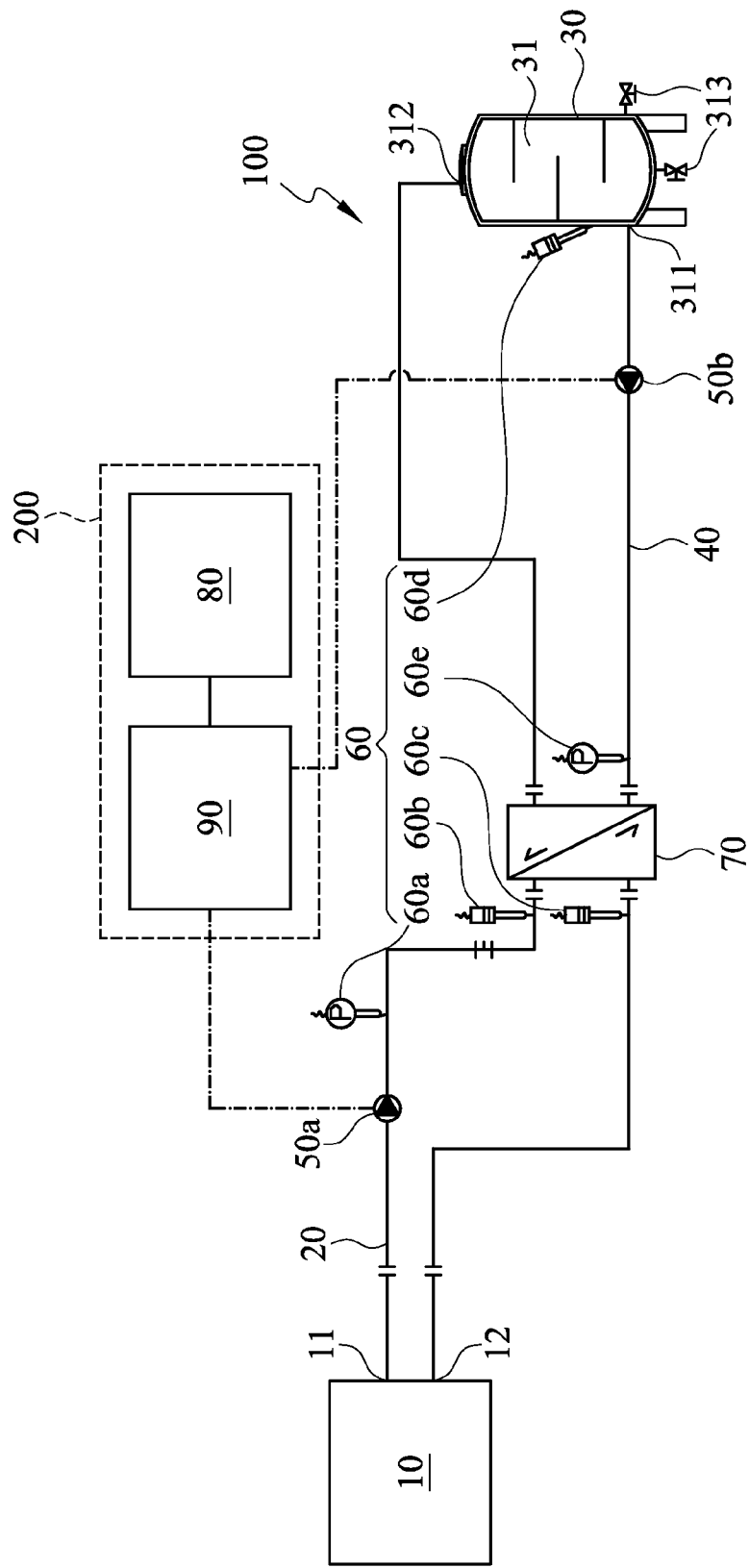
FIG. 1 is a schematic drawing of a fuel-cell-based cogeneration system with radio frequency identification sensors according to one embodiment of the present invention.
Figure 3:
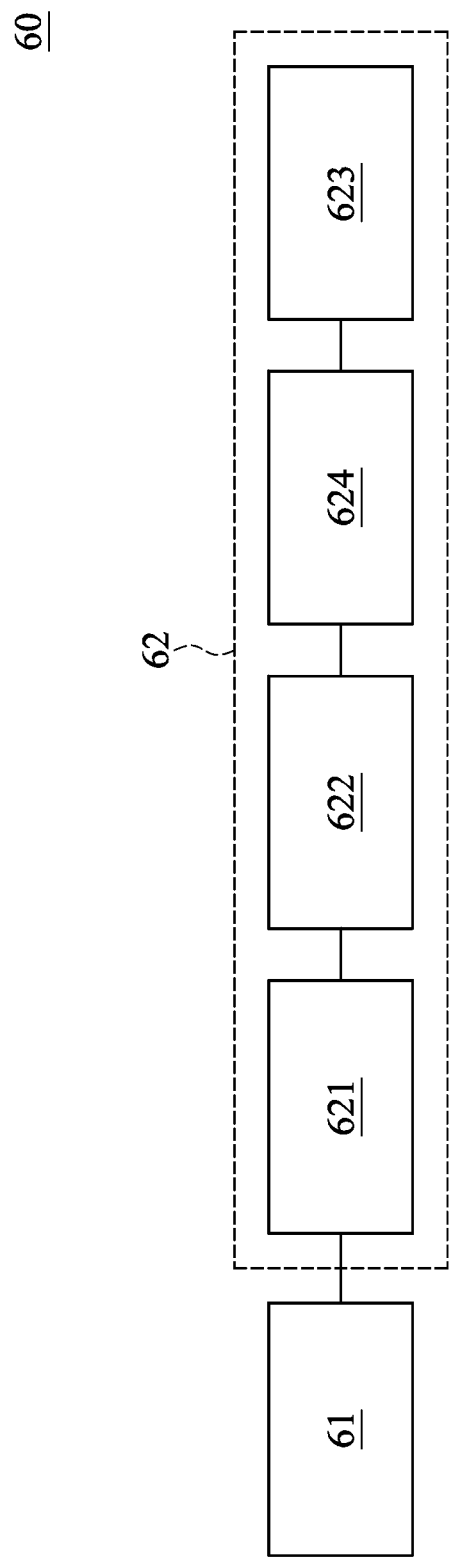
FIG. 3 is a schematic drawing of the RFID sensor according to the embodiment of the present invention.
Figure 4:
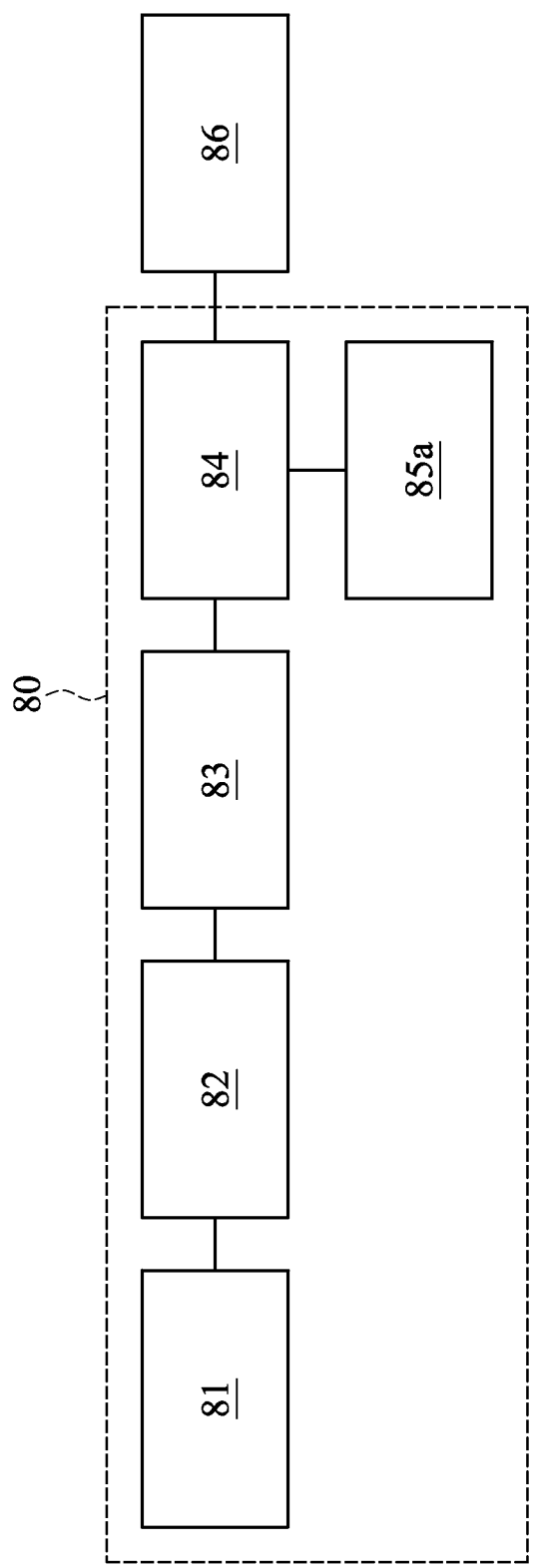
FIG. 4 and FIG. 5 are schematic drawings of an RFID reader and its peripheral interface according to the embodiment of the present invention.
Figure 5:
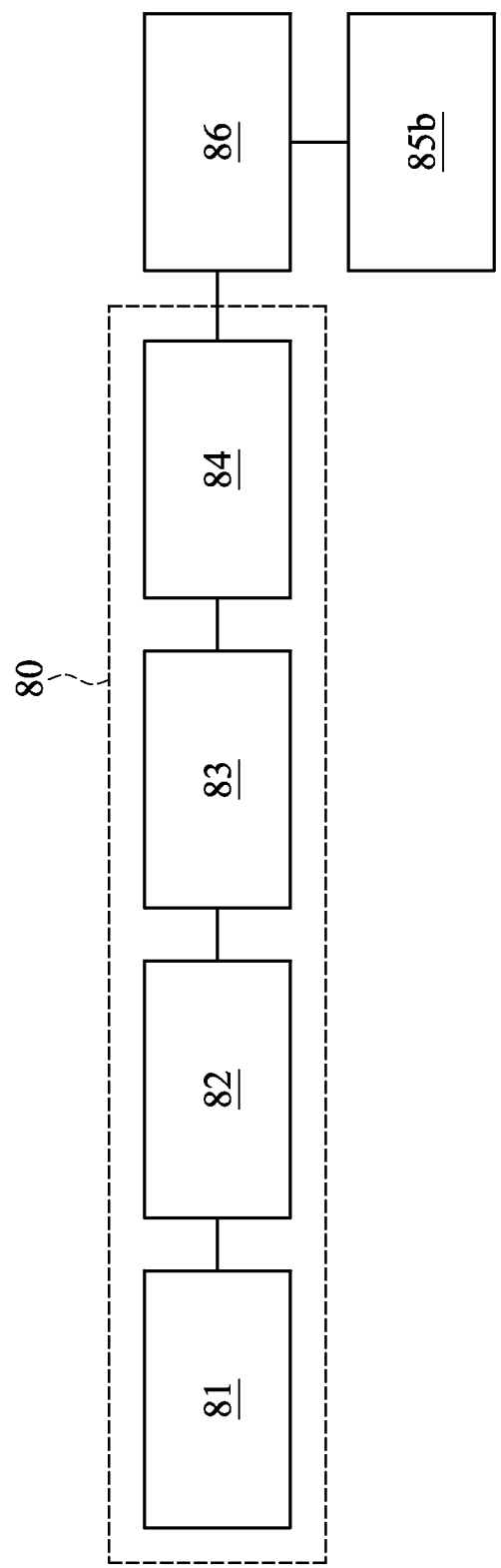

FIG. 1 is a schematic drawing of a fuel-cell-based cogeneration system 100 with RFID sensors 60 according to one embodiment of the present invention. FIG. 2 is a schematic drawing of an RFID package 301 according to the embodiment of the present invention. FIG. 3 is a schematic drawing of one of the RFID sensors 60 according to the embodiment of the present invention. FIG. 4 and FIG. 5 are schematic drawings of an RFID reader 80 and its peripheral interface 86 according to the embodiment of the present invention.

Referring to FIG. 1, the present embodiment is the fuel-cell-based cogeneration system 100 with the RFID sensors 60. It comprises the fuel-cell-based cogeneration system 100 and an RFID data processing system 200. Therein, the RFID data processing system 200 captures the operational status of the fuel-cell-based cogeneration system 100 by means of the RFID technology, so as to monitor the system in a real-time manner.

The fuel-cell-based cogeneration system 100 includes a fuel cell 10, a first heat exchange pipe 20, an isolating device 30 and a second heat exchange pipe 40.

The fuel cell 10 has a first output end 11 and a first input end 12. Water drained out of the fuel cell 10 through the first output end 11, and flows through the first heat exchange pipe 20 before returning to the fuel cell 10 via the first input end 12.

The first heat exchange pipe 20 communicates the first output end 11 with the first input end 12 so as to form a water loop. The waste heat generated by the fuel cell 10 as a result of power generation is brought away from the fuel cell 10 by water. Afterward, the water can be drained out at the first output end 11 and flows through the first heat exchange pipe 20 which the water after heat exchange can be guided back to the fuel cell 10 through the first input end 12.

The first heat exchange pipe 20 has, along the direction of water flows, a heat-dissipating motor 50a, a first RFID sensor 60a, a second RFID sensor 60b, a first lateral of a heat exchanger 70 and a third RFID sensor 60c that are connected in series. The heat-dissipating motor 50a serves to push water to flow in the first heat exchange pipe 20. Thus, by adjusting the rotation speed of the heat-dissipating motor 50a, the flow of water in the first heat exchange pipe 20 can be controlled.

The first RFID sensor 60a is a flow sensor capable of RFID transmission, for detecting the flow of water in the first heat exchange pipe 20, so as to ensure there is sufficient water stably flowing along the first heat exchange pipe 20. The second RFID sensor 60b and the third RFID sensor 60c are temperature sensors, also being capable of RFID transmission. They serve to monitor the temperatures of the water coming into and leaving the heat exchanger 70, respectively.

The isolating device 30 has a chamber 31 and a fourth RFID sensor 60d. The chamber 31 has a second output end 311, a second input end 312 and at least one opening 313, which makes the hot water stored in the isolating device 30 accessible to users. The fourth RFID sensor 60d is a temperature sensor capable of RFID transmission. It is combined with the isolating device 30 for detecting the water temperature in the chamber 31.

The second heat exchange pipe 40 communicates the second output end 311 with the second input end 312, so that the water inside the isolating device 30 is guided out to the heat exchanger 70 through the second output end 311, and the hot water after heat exchange is led back to the isolating device 30 for storage through the second input end 312. Therein, the second heat exchange pipe 40 has, along the direction of water flows, a heat-storing motor 50b, a fifth RFID sensor 60e and a second lateral of the heat exchanger 70 that are connected in series.

The heat-storing motor 50b also serves to push water in the second heat exchange pipe 40 to flow, so the heat-storing motor 50b is usable to control the water flow. The fifth RFID sensor 60e is a flow sensor capable of RFID transmission, for detecting the flow rate of water in the second heat exchange pipe 40.

As shown in FIG. 1, the RFID data processing system 200 comprises an RFID reader 80 and a microprocessor 90.

The RFID reader 80 serves to enable each said RFID sensor 60 and read a signal therefrom. The RFID reader 80 is configured to transmit a first RFID signal. When the RFID sensor 60 is within the transmission range of the RFID reader 80, the RFID sensor 60 receives the first RFID signal and gets enabled, and then sends back a second RFID signal. After receiving the second RFID signal transmitted by any of the RFID sensors 60, the RFID reader 80 is informed of the flow and temperature detected by the corresponding RFID sensor 60.

The microprocessor 90 enables the RFID reader 80, so that the RFID reader 80 transmits the first RFID signal to enable the RFID sensors 60. In addition, the microprocessor 90 may generate a control signal according to the second RFID signal, so as to control the corresponding heat-dissipating motor 50a and heat-storing motor 50b, and thereby adjust water flows to obtain improved heat exchange effect.

As shown in FIG. 2, in the present embodiment, the package 301 of RFID signals and digital signals is composed of addresses and information of the RFID sensors. Thus, as to information transmission, the information source can be identified in virtue of the addresses. Furthermore, bits of each said package 301 may vary with the number of the RFID sensors 60.

Referring to FIG. 3, each of the RFID sensors 60 of the embodiment comprises a detecting module 61 and a data-capturing RFID module 62. The detecting module 61 serves to capture a status signal of the fuel cell 10. The detecting module 61 is composed of a temperature detecting module and a flow detecting module.

According to the present embodiment, the detecting modules 61 in the first and fifth RFID sensors 60a and 60e are flow detecting module. When the flow detecting module detects that there is no water flowing or there is abnormal water level in the first heat exchange pipe 20 or the second heat exchange pipe 40, the system generates a warning of abnormal operation.

The detecting modules 61 in the second, third and fourth RFID sensors 60b, 60c, 60d are temperature detecting module, and the temperatures detected by the second and third RFID sensors 60b, 60c are used as a basis for determining the rotation speed of the heat-dissipating motor 50a and the heat-storing motor 50b.

The data-capturing RFID module 62 comprises a capturing-and-amplifying unit 621, a first digital data processing unit 622, a first antenna 623 and a first RFID unit 624.

The capturing-and-amplifying unit 621 is electrically connected between the detecting module 61 and the first digital data processing unit 622. The capturing-and-amplifying unit 621 converts the status signal of the fuel cell 10 received by the detecting module 61 into a first digital signal, and then the first digital data processing unit 622 converts the first digital signal into a second RFID signal.

The first RFID unit 624 is electrically connected between the first digital data processing unit 622 and the first antenna 623. The first RFID unit 624 transmits the second RFID signal by means of the first antenna 623. In addition, the first RFID unit 624 also receives the first RFID signal by means of the first antenna 623, and then according to the first RFID signal enables the data-capturing RFID module 62 to capture the status signal of the fuel cell 10.

As shown in FIG. 4 and FIG. 5, the RFID reader 80 includes a second antenna 81, a second RFID unit 82, a second digital data processing unit 83 and a data collecting unit 84.

The second antenna 81 serves to transmit the first RFID signal and to receive the second RFID signal. The second RFID unit 82 is electrically connected to the second antenna 81 and the second digital data processing unit 83. After the second antenna 81 receives the second RFID signal, the second RFID unit 82 receives the second RFID signal output by the second antenna 81. Then the second digital data processing unit 83 converts the received second RFID signal into a second digital signal. Moreover, the second RFID unit 82 also transmits the first RFID signal by means of the second antenna 81.

The data collecting unit 84 is electrically connected to the second digital data processing unit 83, and stores a predetermined data signal as a criterion indicating the system's normal operation. The predetermined data signal includes the relation between the water temperature and the rotation speed of the motors 50a, 50b in normal operation. The microprocessor 90 compares the second digital signal with the predetermined data signal so as to generate a control signal for controlling the heat-dissipating motor 50a and the heat-storing motor 50b, thereby allowing the motors 50a, 50b to operate corresponding to the water temperature, and in turn optimizing the heat energy conversion rate.

Therein, basing on the comparison between the second digital signals generated by the second and third RFID sensors 60b, 60c and the predetermined data signal, when the second RFID sensor 60b detects an elevated water temperature, meaning that the water flowing into the heat exchanger 70 is warmer, the rotation speed of the heat-dissipating motor 50a has to be increased to make the hot water generated by the fuel cell 10 enter the heat exchanger 70 quickly, thereby accelerating heat exchange. Similarly, when the second digital signal of the third RFID sensor 60c indicates that the water flowing out the heat exchanger 70 becomes warmer, the rotation speed of the heat-storing motor 50b has to be increased, so as to prompt the water in the second heat exchange pipe 40 to enter the heat exchanger 70, thereby improving heat exchange speed and lowering the water temperature detected by the third RFID sensor 60c.

Referring to FIG. 4, the RFID reader 80 may further comprise a first memory device 85a, which is electrically connected to the data collecting unit 84, so that the data collecting unit 84 is allowed to store the second digital signal in the first memory device 85a.

Moreover, the RFID reader 80 may further comprise a peripheral interface 86, which is electrically connected to the data collecting unit 84. The peripheral interface 86 may be a serial port, a parallel port or a universal serial bus, and the second digital signal may be output through the peripheral interface 86. As shown in FIG. 5, the peripheral interface 86 may be further electrically connected to a second memory device 85b, which similarly serves to store the second digital signal.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A fuel-cell-based cogeneration system with radio frequency identification sensors, comprising:
the fuel-cell-based cogeneration system including:
a fuel cell having a first output end and a first input end;
a first heat exchange pipe communicating the first output end and the first input end, and having a heat-dissipating motor, a first RFID sensor, a second RFID sensor, a first lateral of a heat exchanger and a third RFID sensor connected successively in series along a direction of water flows therein;
an isolating device having a chamber, which comprises a second output end, a second input end and at least one opening; and a fourth RFID sensor that is combined with the isolating device for detecting a water temperature in the chamber; and
a second heat exchange pipe communicating the second output end and the second input end, and having a heat-storing motor, a fifth RFID sensor and a second lateral of the heat exchanger connected successively in series along a direction of water flows therein; and
an RFID data processing system including:
an RFID reader, when enabled, transmitting a first RFID signal to each said RFID sensor, and receiving a second RFID signal transmitted by each said RFID sensor; and
a microprocessor enabling the RFID reader, and generating a control signal according to the second RFID signal for controlling the heat-dissipating motor and the heat-storing motor.

2. The fuel-cell-based cogeneration system of claim 1, wherein each said RFID sensor comprises:
a detecting module capturing a status signal of the fuel cell; and
a data-capturing RFID module including;
a capturing-and-amplifying unit being electrically connected to the detecting module for converting the received status signal into a first digital signal;
a first digital data processing unit being electrically connected to the capturing-and-amplifying unit for converting the first digital signal into the second RFID signal;
a first antenna serving to transmit the second RFID signal and to receive the first RFID signal; and
a first RFID unit being electrically connected to the first digital data processing unit and the first antenna, enabling the data-capturing RFID module according to the first RFID signal, and transmitting the second RFID signal via the first antenna.

3. The fuel-cell-based cogeneration system of claim 1, wherein the RFID reader comprises:
a second antenna serving to transmit the first RFID signal and to receive the second RFID signal;
a second RFID unit being electrically connected to the second antenna, receiving the second RFID signal output by the second antenna, and transmitting the first RFID signal via the second antenna;
a second digital data processing unit being electrically connected to the second RFID unit for receiving the second RFID signal and converting the second RFID signal into a second digital signal; and
a data collecting unit being electrically connected to the second digital data processing unit, and storing a predetermined data signal, wherein the microprocessor compares the second digital signal with the predetermined data signal and generates the control signal accordingly.

4. The fuel-cell-based cogeneration system of claim 3, wherein the RFID reader further comprises a first memory device for storing the second digital signal.

5. The fuel-cell-based cogeneration system of claim 3, wherein the RFID reader further comprises a peripheral interface, which is electrically connected to the data collecting unit.

6. The fuel-cell-based cogeneration system of claim 5, wherein the peripheral interface is a serial port, a parallel port or a universal serial bus.

7. The fuel-cell-based cogeneration system of claim 5, wherein the peripheral interface further comprises a second memory device for storing the second digital signal.

\* \* \* \* \*